(12) United States Patent
Remillard et al.

(10) Patent No.: US 10,536,033 B2
(45) Date of Patent: Jan. 14, 2020

(54) SYSTEM AND METHOD OF BI-DIRECTIONAL COMMUNICATION FOR POSITION SENSORS INVOLVING SUPERPOSITION OF DATA OVER LOW VOLTAGE DC POWER USING TWO CONDUCTORS

(71) Applicant: Novanta Corporation, Bedford, MA (US)

(72) Inventors: Paul A. Remillard, Littleton, MA (US); Andrew M. Goldman, Stow, MA (US); Mark Lang, Cranston, RI (US)

(73) Assignee: Novanta Corporation, Bedford, MA (US)

( * ) Notice: Subject to any disclaimer, the term of this patent is extended or adjusted under 35 U.S.C. 154(b) by 0 days.

(21) Appl. No.: 15/467,944

(22) Filed: Mar. 23, 2017

(65) Prior Publication Data

US 2017/0294805 A1    Oct. 12, 2017

Related U.S. Application Data

(60) Provisional application No. 62/312,261, filed on Mar. 23, 2016.

(51) Int. Cl.
*H04W 52/04*      (2009.01)
*H04N 21/422*    (2011.01)
(Continued)

(52) U.S. Cl.
CPC ...... *H02J 13/0024* (2013.01); *H04B 7/18523* (2013.01); *H04H 60/31* (2013.01);
(Continued)

(58) Field of Classification Search
None
See application file for complete search history.

(56) References Cited

U.S. PATENT DOCUMENTS

| 5,103,466 A | 4/1992 | Bazes |
| 5,424,710 A | 6/1995 | Baumann |

(Continued)

OTHER PUBLICATIONS

Invitation to Pay Additional Fees dated Jun. 2, 2017 in connection with International Application No. PCT/US2017/023755.

(Continued)

*Primary Examiner* — Edan Orgad
*Assistant Examiner* — Emmanuel K Maglo
(74) *Attorney, Agent, or Firm* — Wolf, Greenfield & Sacks, P.C.

(57) ABSTRACT

A communication system that involves superimposing data over DC power. The data takes the form of high bitrate digital signals, where the bitrate is much higher than 0 Hz (DC); this separation allows the AC signal to be easily separated from the DC power. The physical system consists of a two conductor cable, and integration is modular, in that multiple slaves can be connected and disconnected to a master through a routing bus also comprising two conductors. The master can communicate bi-directionally with the slave(s), and the data is encoded using DC-balanced encoding in an FPGA. The data is sent to and from a differential signaling transmitter/receiver pairs at each end of the cable. The system is may be used with position sensors, and provides the benefit of reducing cable costs and sensor size due to the decrease in number of conductors and elimination of power components in the sensor.

20 Claims, 10 Drawing Sheets

(51) Int. Cl.
*H02J 13/00* (2006.01)
*H04B 7/185* (2006.01)
*H04H 60/31* (2008.01)
*H04N 5/445* (2011.01)
*H04N 21/4363* (2011.01)

(52) U.S. Cl.
CPC ... *H04N 5/44582* (2013.01); *H04N 21/42207* (2013.01); *H04N 21/43637* (2013.01); *H04W 52/04* (2013.01)

(56) References Cited

U.S. PATENT DOCUMENTS

| | | | |
|---|---|---|---|
| 6,522,650 B1 | 2/2003 | Yonge et al. | |
| 7,855,906 B2 | 12/2010 | Klodowski et al. | |
| 8,233,955 B2 | 7/2012 | Al-Ali et al. | |
| 8,812,760 B1* | 8/2014 | Bamford | G06F 5/065 710/110 |
| 9,654,179 B2* | 5/2017 | Shultz | H04B 5/0012 |
| 2005/0038614 A1* | 2/2005 | Botts | G01R 31/3606 702/63 |
| 2007/0250652 A1* | 10/2007 | Ng | G06F 13/4077 710/110 |
| 2013/0322461 A1* | 12/2013 | Poulsen | H04J 3/02 370/458 |
| 2013/0322462 A1* | 12/2013 | Poulsen | H04J 3/06 370/458 |
| 2014/0025854 A1* | 1/2014 | Breuninger | G05B 19/0423 710/110 |
| 2014/0249033 A1 | 9/2014 | Orozco et al. | |
| 2014/0301491 A1 | 10/2014 | Yamamoto | |
| 2015/0044966 A1* | 2/2015 | Shultz | H04B 5/0012 455/41.1 |
| 2015/0355610 A1* | 12/2015 | Petrocy | G05B 19/0421 700/20 |
| 2016/0116356 A1* | 4/2016 | Goldstein | B62J 99/00 73/1.15 |
| 2016/0170934 A1* | 6/2016 | Haejong | G06F 13/4291 710/110 |
| 2017/0222829 A1* | 8/2017 | Kessler | H04L 12/43 |
| 2018/0121384 A1* | 5/2018 | Podsiadlo | G06F 13/404 |

OTHER PUBLICATIONS

International Search Report and Written Opinion dated Aug. 7, 2017 in connection with International Application No. PCT/US2017/023755.

International Preliminary Report on Patentability dated Oct. 4, 2018 in connection with International Application No. PCT/US2017/023755.

* cited by examiner

SYSTEM AND METHOD OF BI-DIRECTIONAL COMMUNICATION FOR POSITION SENSORS INVOLVING SUPERPOSITION OF DATA OVER LOW VOLTAGE DC POWER USING TWO CONDUCTORS

RELATED APPLICATIONS

This application is a non-provisional of and claims priority under 35 U.S.C. § 119(e) to U.S. Provisional Patent Application Ser. No. 62/312,261, entitled "COMMUNICATION SYSTEM FOR POSITION SENSORS EMPLOYING SERIAL DATA OVER DC POWER," filed Mar. 23, 2016, herein incorporated by reference in the entirety.

SUMMARY

In products that require external DC power and also have many signal inputs and outputs, it is appreciated that the cables involved in the transmission of these power and data signals can become very cumbersome. It would be desirable to reduce the amount of conductors in these cables, as it will cut down on manufacturing costs, materials costs, space usage, and weight.

In traditional sensor technologies, such as linear and rotary position encoders which is the case for certain applications of various embodiments described herein, DC power is usually provided via two conductors. The output of the sensor (i.e., the sensed position data in the form of an electrical signal) is provided through one or multiple supplemental conductors in addition to the two power conductors. Overall, these multiple conductor cables may require a lot of material, cost, and take up a lot of space.

In position encoder technology, the sensors need to be very small and light, because the sensors are usually mounted to moving parts inside robotics or machinery, and the position sensors themselves should not constrain the movement of said technology. The typical size of an encoder readhead of a sensor is the size of a small coin (e.g., a US nickel). Sensor readhead cables are usually integrated via a hardwired connection; this avoids having to use a large connector, which takes up space, but sacrifices the ability to have a modular system. According to various embodiments described herein, very small connectors that are also modular may be used to preserve space.

Many methods have been implemented in the past in other technical domains to solve the issues of reducing cable size and cost, but these implementations tend to involve modulation of AC signals over AC power, and they generally involve modulating both the power and the signals. According to various embodiments, it is appreciated that it may be undesirable to modulate AC power for several reasons: (1) in applications with relatively short distance cables, use of AC power does not provide a significant advantage, (2) in sensor devices that operate on low power, the use of low voltage DC is optimal, and (3) because encoders are very small devices, and space is usually a constraint, the circuitry required to modulate AC signals and AC power takes up too much space. For these reasons, among others, it may be beneficial to superimpose AC signals over DC power provided to a sensor device. There are also many ways to couple the AC signals. For example, coupling may be accomplished using inductive or capacitive components.

One example method makes use of a differential signaling transmitter/receiver pair to transmit data which is capacitively coupled onto low voltage DC power lines. One example method makes use of an low voltage differential signaling (LVDS) transmitter/receiver pair to transmit data which is capacitively coupled onto low voltage DC power lines. In another example, Manchester coding may be used. However, although LVDS or Manchester encoding may be used, it should be appreciated that other DC-balanced and/or differential signaling methods may be used. For example, encoding schemes similar to those used in RS-422, RS-485 or others types may be used.

An example of a system that modulates data over AC power is Power over Ethernet. The reason this system uses AC power is because it is necessary to drive loads that are separated by long distances, and to do this at high efficiency (i.e., without dissipating significant power along the way). Power over Ethernet systems generally are used with large devices such as computers, routers, printers, etc. However, according to various embodiments applied to miniature position encoders, the communication system is highly constrained to be as small as possible, and because it is appreciated that in certain embodiments power requirements are modest, therefore, using data communication over DC power provides a unique solution.

The field of application described in this document pertains to communication of digital signals on a physical cable, as well as encoding of data over power lines or other media. Aspects relate to digital signal encoding, AC modulation, and decoding at high clock rates. The specific application of technology can be used with position sensors. According to one aspect, a communication interface is provided that permits external signals to be routed between master device and slave devices (e.g., sensors) in a distributed sensor network.

According to one aspect, a sensor is provided comprising an interface having two conductors coupled to one or more external processing elements, a power-receiving element, coupled to the two conductors and adapted to receive a DC power from the two conductors, and a data-receiving element, coupled to the two conductors and adapted to receive an AC data signal superimposed over the DC power. In one embodiment, the AC data signal is encoded using digital data. In another embodiment, the AC data signal contributes a substantially zero superimposed DC voltage to the two conductors.

According to another embodiment, the sensor is an optical position sensor. In another embodiment, the sensor comprises an coupling element that adaptably receives a cable that is adaptively coupled to a master device. According to another embodiment, the cable is capable of being removed from the coupling element by an end user.

In another embodiment, the received DC power is generated by a master device coupled to the two conductors. In yet another embodiment, more than one sensor is coupled to the master device by the two conductors and receives DC power from the master device. In another embodiment, the sensor operates as a slave device, and wherein the slave device is directly coupled to a master device through the two conductors.

In another embodiment, the slave device and master device communicate in a bi-directional manner over the two conductors. In another embodiment, the master is adapted to assign a unique address to any slave device coupled to the master through the two conductors. In another embodiment, the master is adapted to communicate to a plurality of slave devices using a multicast address. In another embodiment, the sensor includes at least one boost regulator that boosts the DC power signal. In another embodiment, the AC data signal is capacitively coupled. In another embodiment, the AC data signal is encoded using at least one of Manchester encoding and a DC-balanced encoding. In another embodiment, the received DC power is a 5V power source. In another embodiment, the at least one of the two conductors is coupled to ground.

According to another aspect, a distributed system is provided comprising a master device and a slave device, the slave device being operatively coupled to the master device by a two-conductor cable, wherein the master device is adapted to provide DC power to the slave device via the two-conductor cable and wherein the master device and slave device are operable to communicate over the two-conductor cable using a superimposed AC signal.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

According to various aspects, a communication system is provided that permits a master to communicate with one or more slave devices using an AC signal superimposed on a low level DC power supply voltage. In one implementation, this DC power supply voltage may be provided to one or more of the slave devices. In one example, a packet-based communication protocol is provided that allows bidirectional communication between master and slave devices. In another implementation, cabling that couples masters and slaves is a simple two-conductor twisted-pair cable. In other implementations, the protocol includes error detection (and in some cases), correction features.

Figure 1:
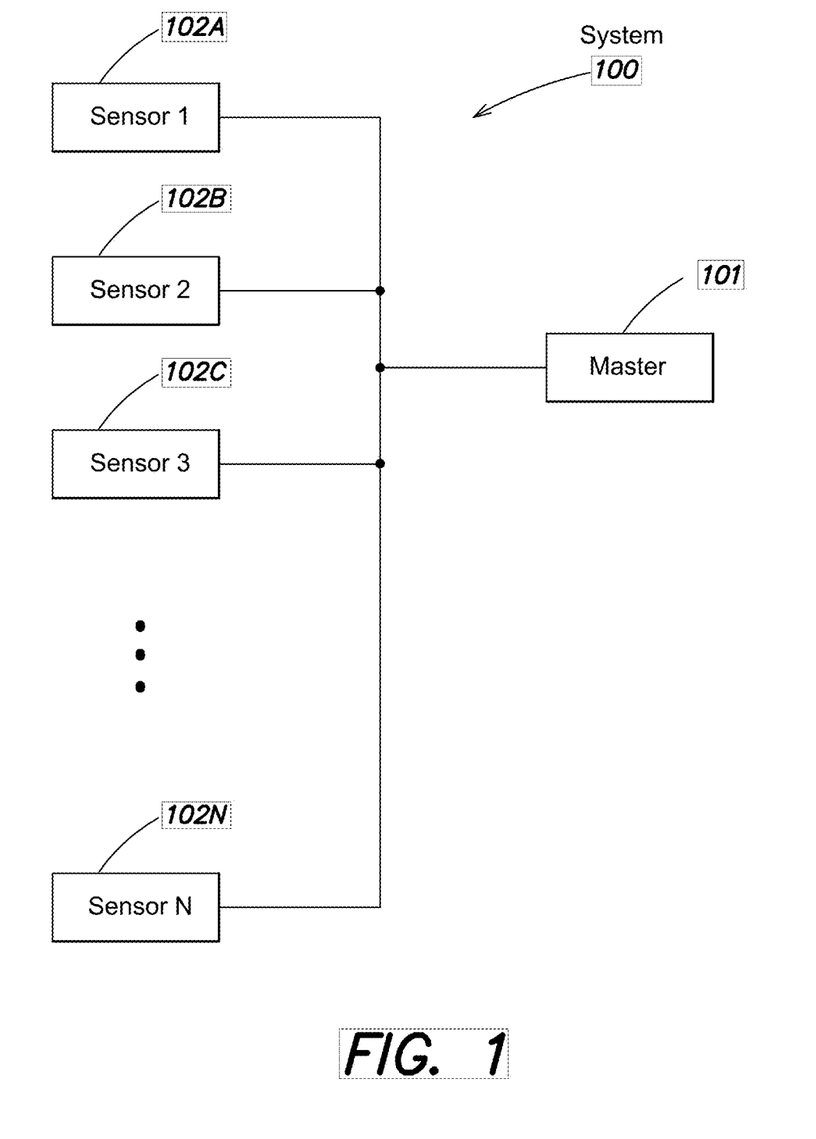
FIG. 1 shows a distributed sensor network in communication with a master device according to one embodiment.

FIG. 1 shows an example distributed sensor network in communication with a master device according to one embodiment. In particular, system 100 may include one or more sensor devices (e.g. sensor 1 (102A) sensor 2 (102B), sensor 3 (102C), . . . sensor N (102N)) coupled to a master device 101 over a shared communication network. According to one implementation, the shared communication network includes a two conductor cable which includes a DC power supply with a superimposed AC signal. In one implementation, each of the devices are able to view communications from any other device. As discussed above, there may be one master in communication with any number of sensor devices for the purpose of detecting motion, position, or other parameters.

Figure 2:
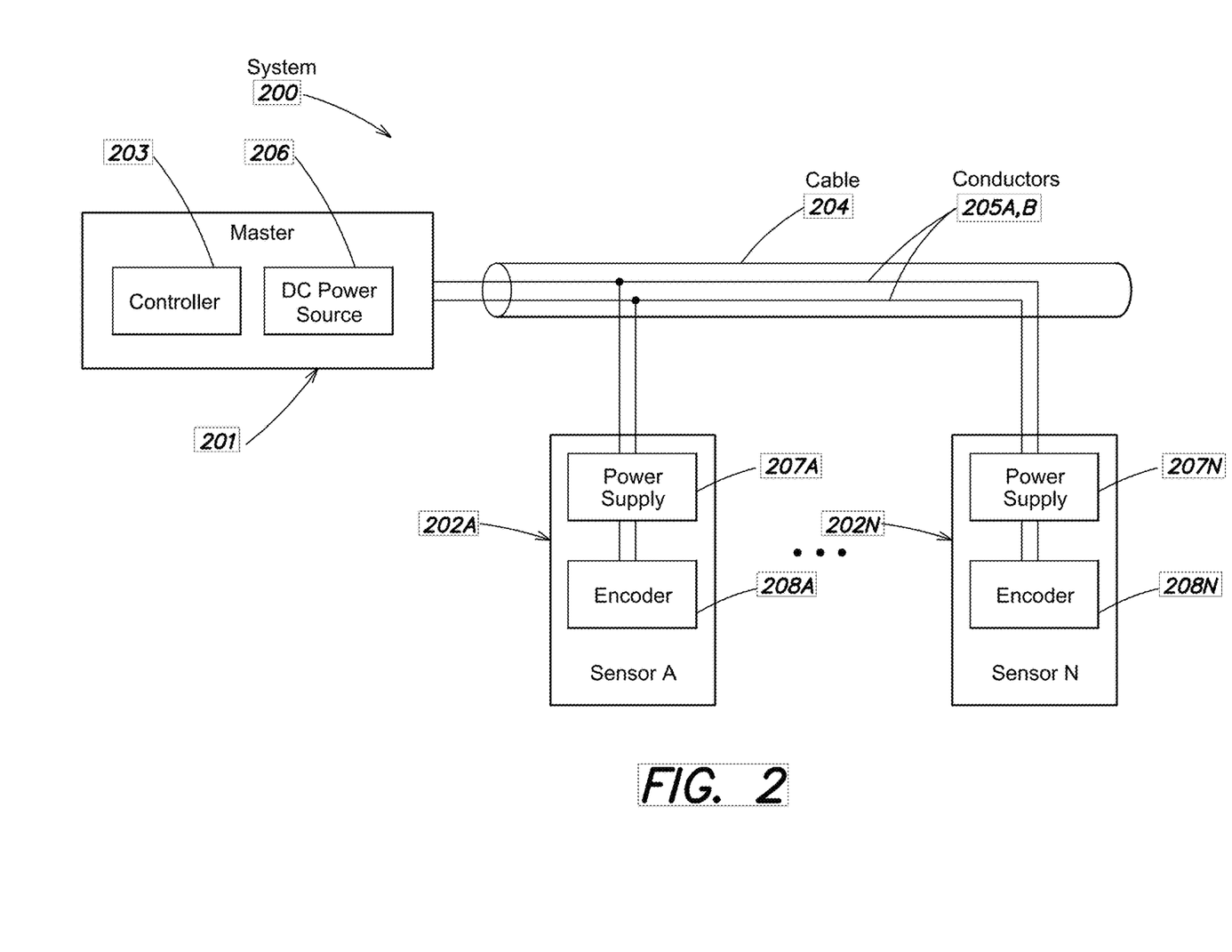
FIG. 2 shows a more detailed sensor network and master device according to one embodiment.

FIG. 2 shows a more detailed sensor network and master device according to one embodiment. For example, the systems of system 100 above may include subcomponents as shown in FIG. 2. In particular, system 200 includes a master 201 coupled to one or more sensors (e.g., sensor A (202A) . . . sensor N (202N)) via a cable 204. Cable 204, in one example implementation, may comprise two conductors 205A, 205B. Each of the sensors in master may be directly connected to these conductors, and according to one embodiment, master 201 may provide DC power to the interconnected sensors.

Master 201 may include the controller 203 as well as a DC power source 206 which provides power to the sensor devices over the two conductor cable. Each of the sensor devices may include a power supply element (e.g., 207A . . . 207N) which retrieves the DC signal and separates the AC data signal to power components internal to the sensor such as an encoder (e.g., encoder 208A . . . 208N) which is adapted to encode sensed parameters and communicate information back to controller 203. The encoders may also be capable of serializing and de-serializing data imposed on the conductors.

Figure 3:
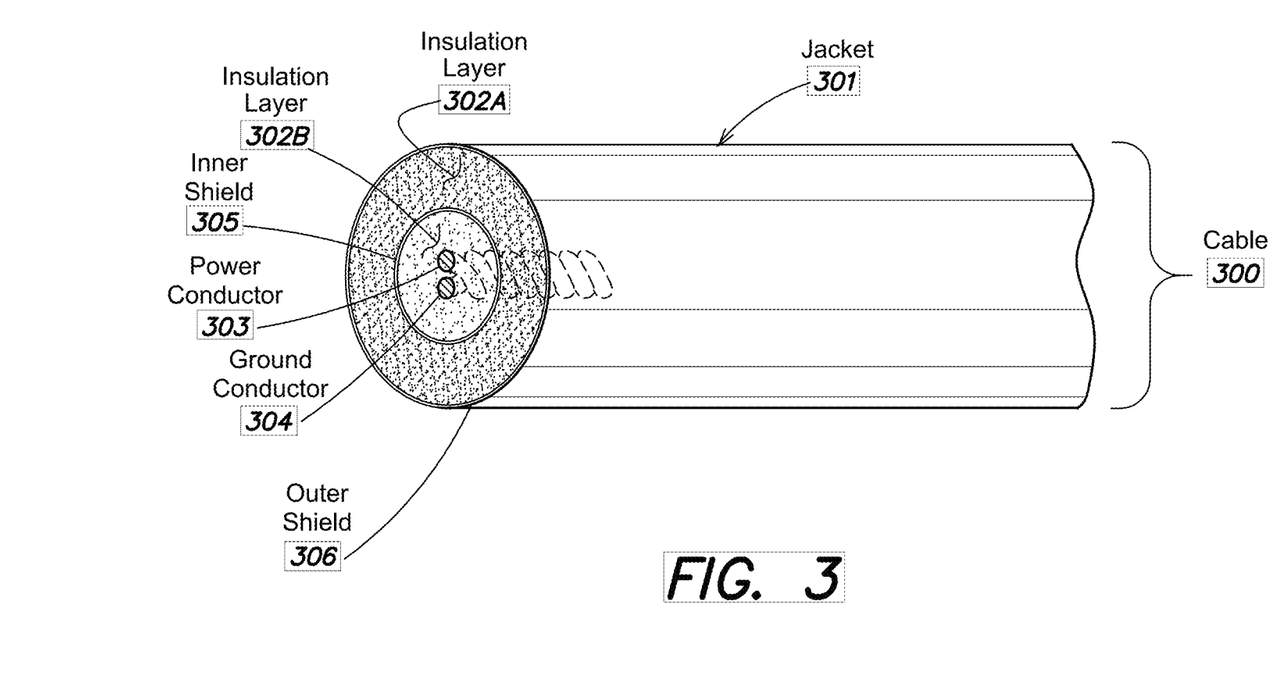
FIG. 3 shows an example signal cable that may be used according to various embodiments.

FIG. 3 shows an example signal cable having two conductors that may be used to connect master and slave devices according to one embodiment. In particular, cable 300 may include one or more layers in one or more conductive shields and conductor elements. In particular, cable 300 includes a jacket 301 surrounding a first insulation layer 302A which leads to an inner shield 305. Inside the inner shield 305, is an additional insulation layer 302B which surrounds two twisted-pair conductors. In particular cable 300 may include a power conductor 303 and a ground conductor 304 which are used to both provide DC power as well as a superimposed AC data signal. The interior of the cable may be surrounded by an outer shield 306. Notably, the cable may be suitable for communicating a small DC voltage (e.g., 5 V)

as well as a superimposed AC signal that is used to communicate data. In one embodiment, the AC signal has an encoding scheme that has an overall zero value DC voltage, and therefore does not interfere with the power supply being provided to various connected sensors. In one example, the AC signal may be encoded using Manchester encoding.

Figure 4A:
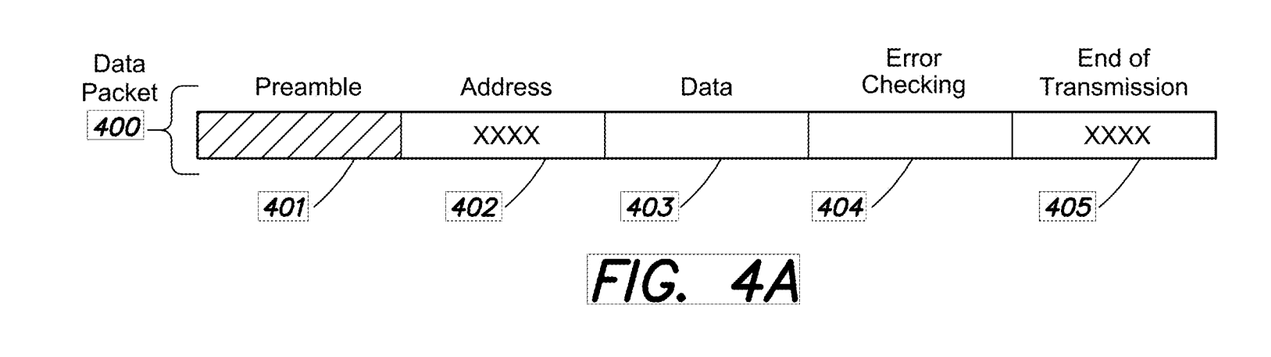
FIGS. 4A-4B show various message formats that may be used according to various embodiments.
Figure 4B:
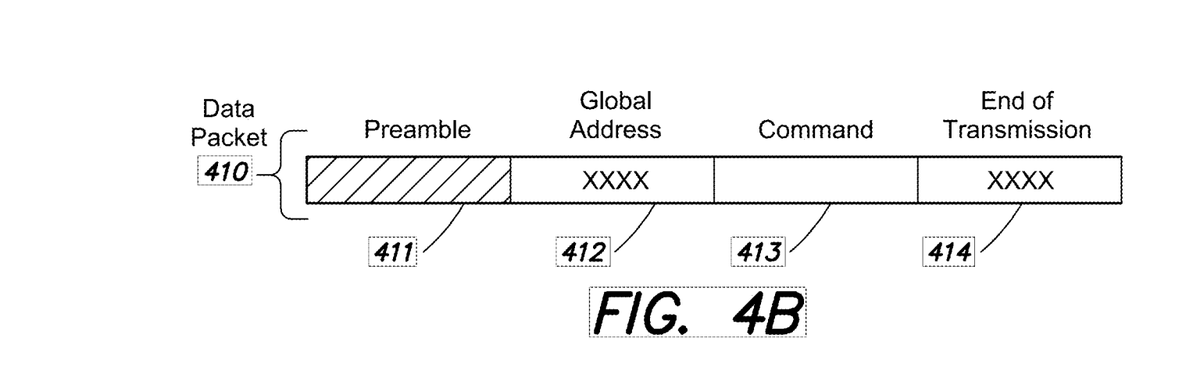

FIGS. 4A-4B show various message formats that may be used according to various embodiments. In particular, a data packet 400 shown in FIG. 4A may be used to communicate between various entities. In one implementation, the data packet may be, for example, a Manchester encoded frame (or other DC-balanced encoding method (e.g., 8B/10B encoding)) sent serially along the conductor, the frame having one or more portions of control and signal data. In particular, data packet 400 may include preamble 401 which indicates the beginning of a frame and provides clocking data to a receiving entity. Packet 400 may also include address information within the frame (e.g. address field 402). The address may indicate, for sensor device, a specific sensor that is communicating information to the master device. Packet 400 may also include a data portion 403 which includes one or more parameters associated with that particular sensor. Toward the end of the frame, packet 400 may include error checking information 404 such as a CRC or other error checking information. In field 405, sensor may indicate an end of transmission by including information that identifies the end of the frame.

Data packet 410 of FIG. 4B may be used to communicate information from a master device to multiple devices. In particular, data packet 410 may include of preamble section 411 used to indicate the beginning of the frame and providing clocking data to a receiving entity. Packet 411 may also include global address information 412 which identifies, a multicast address for a group or all sensor devices (e.g., a broadcast address). It may be useful, for example, for a master device to issue a command to the group or all sensors, and therefore, data packet 410 may include a command field 413 indicating the command to be executed by the sensors. In field 414, the master may include end of transmission information that identifies the end of the frame. Optionally, the frame include error checking information similar to data packet 400. Although data packets 400 and 410 are shown by way of example, it should be appreciated that other packet formats having more or less information may be used. Also, it should be appreciated that any error detection or correction mechanism may be used, and the frame may include any necessary additional information to facilitate this function.

Figure 5:
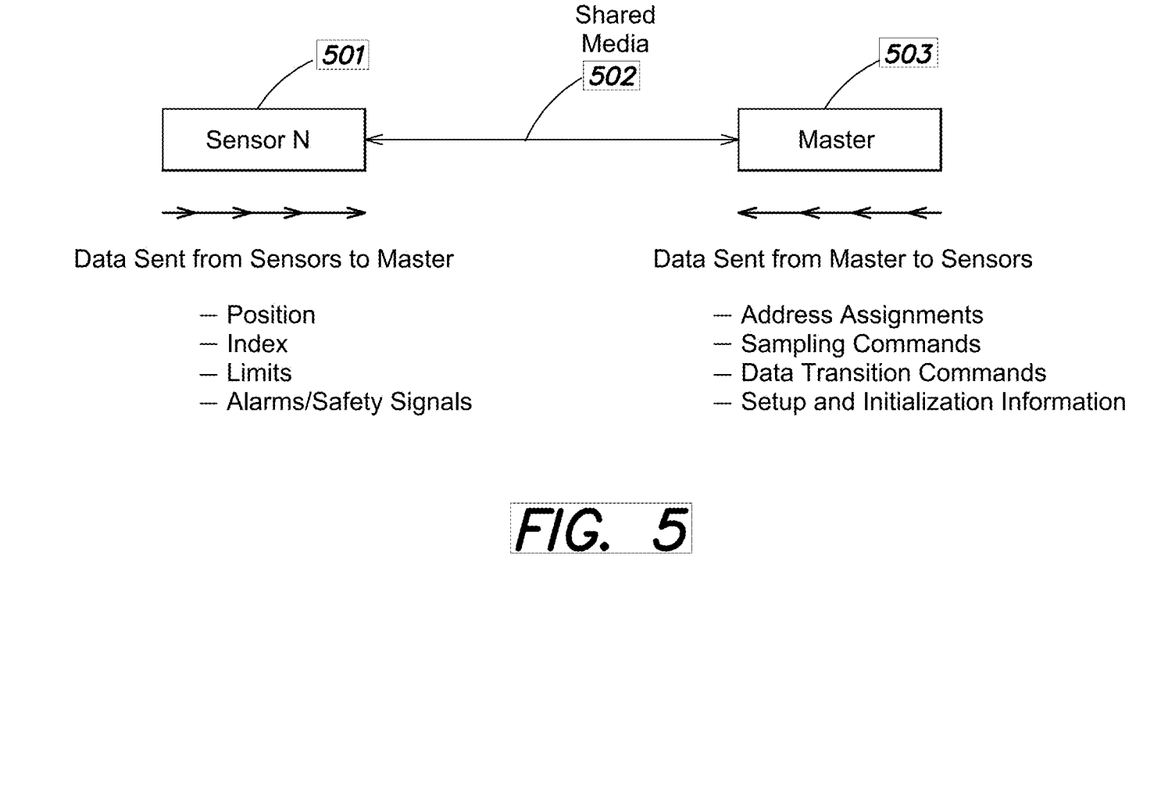
FIG. 5 shows various data types that may be communicated between master and slave devices according to various embodiments.

FIG. 5 shows various data types that may be communicated between master and slave devices according to various embodiments. For example, one or more types of information may be communicated between one or more sensors (e.g., sensor N (501)) and a master device 503 over a shared communication medium (e.g. shared media 502) such as a bus and/or common conductor cable. Such information sent from one or more sensors to a master may include, for example, position information, index information, limits of the particular sensor, alarms and/or safety signals, among other information. Data that may be communicated from a master to one or more sensors includes for example, address assignments (e.g., as a sensor is admitted to the network, and address may be assigned to that sensor), one or more sampling commands that permit the controller to sample data from one or more sensors, data transition commands, set up an initialization information, among other information.

Figure 6A:
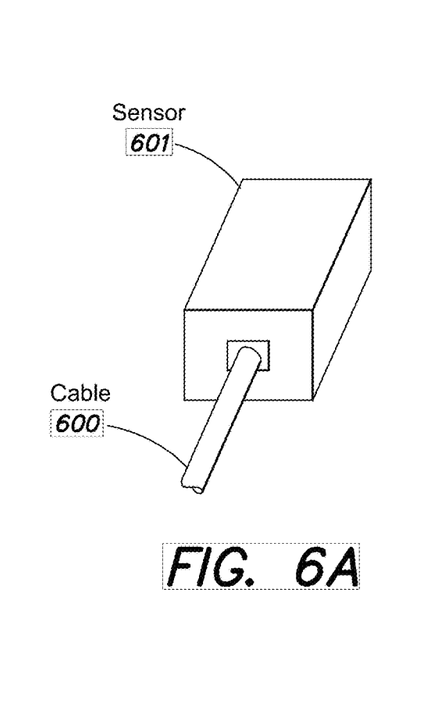
FIGS. 6A-6C show various sensor cable and connector configurations according to various embodiments.
Figure 6B:
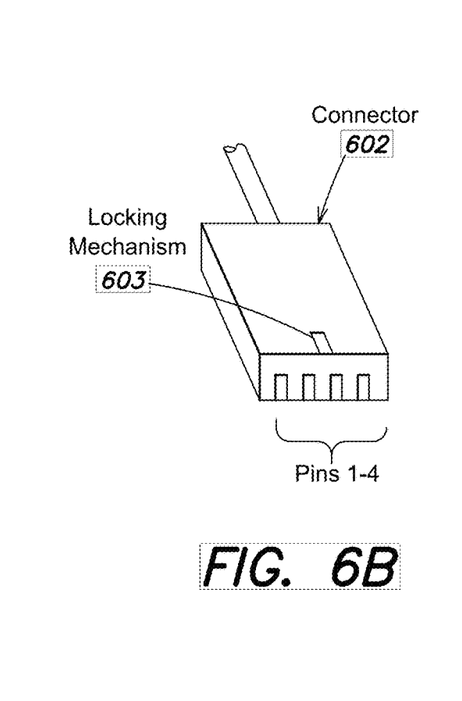
Figure 6C:
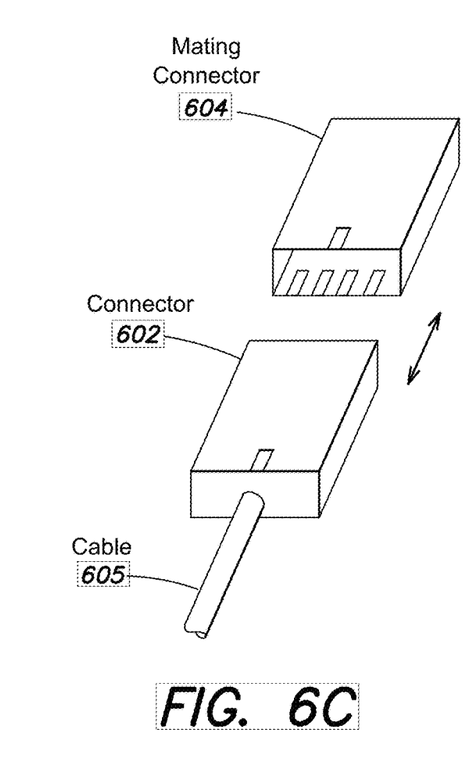

FIGS. 6A-6C show various sensor cable and connector configurations according to various embodiments. In particular, FIG. 6A shows a cable 600 coupled to a sensor device 601 (e.g., a position sensor). As shown, the cable such as the one shown by way of example in FIG. 3, may be terminated within the sensor. On an opposite and, a low profile connector may be provided which includes a number of pins (e.g., pins 1-4) inside the connector, and the connector has a locking mechanism which attaches to, for example, as shown in FIG. 6C, mating connector 604 which accepts the connector 602 and attached cable 605.

Figure 7A:
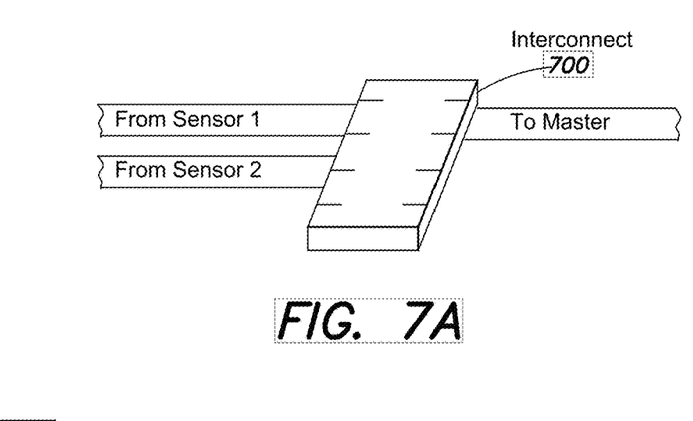
FIGS. 7A-7C show various interconnects and configurations according to various embodiments.
Figure 7B:
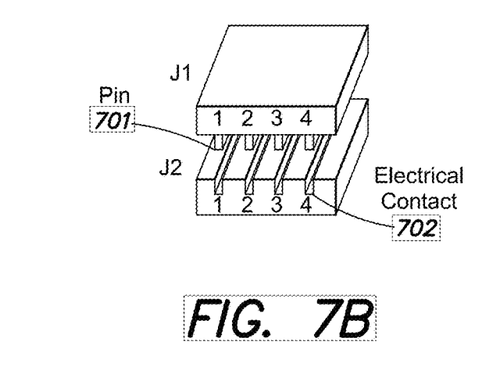
Figure 7C:
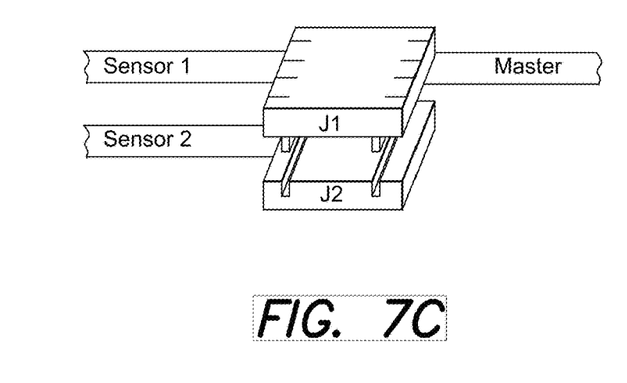

FIGS. 7A-7C show various interconnects and configurations according to various embodiments. For example, there may be other types of interconnects that are used to couple sensor devices to a master device. In particular, shown in FIG. 7A, cables may be coupled using an interconnect 700 which connects the ground and power conductors as well as the shields from the various cables. As shown with more particularity in FIG. 7B, a pin 701 may be coupled to an electrical contact 702 in a stacked interconnect arrangement. Another stacked arrangement is shown by way of example in FIG. 7C where a J1 interconnect portion is coupled with a J2 interconnect portion. As shown, a number of sensors may be directly coupled to the stackable portions, and the interconnect between multiple sensors may be achieved by stacking additional interconnect portions.

Figure 8A:
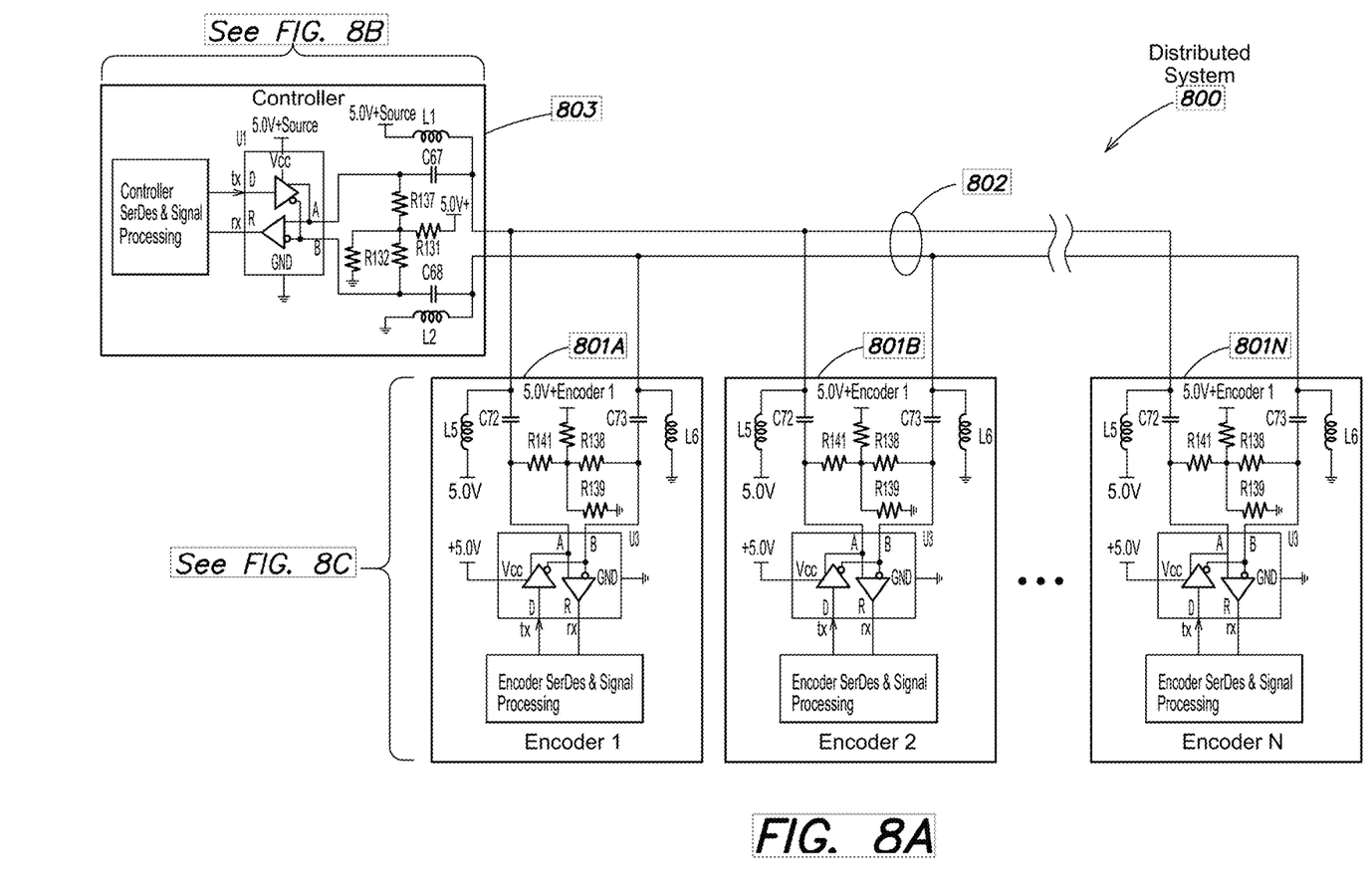
FIGS. 8A-8C show a circuit diagram of a master and slave according to various embodiments.
Figure 8B:
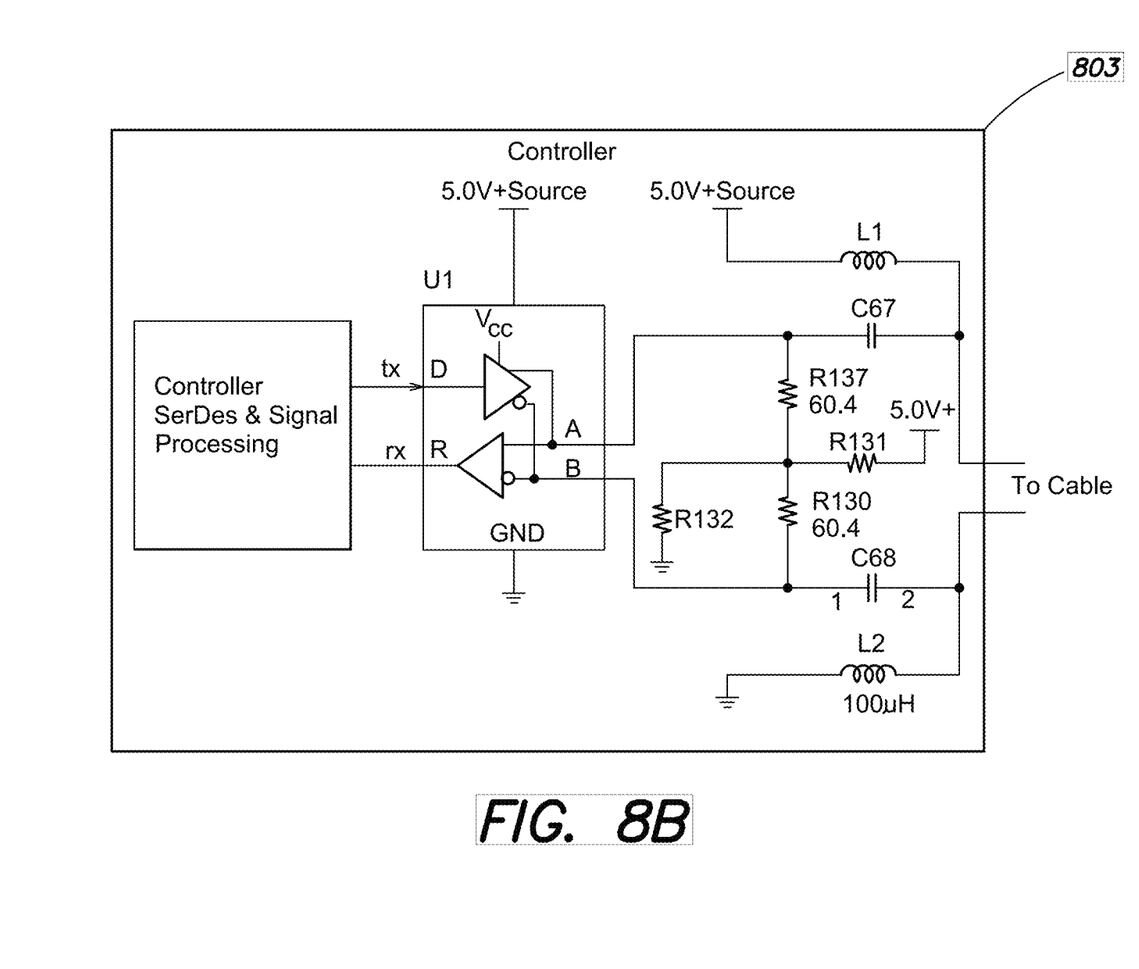
Figure 8C:
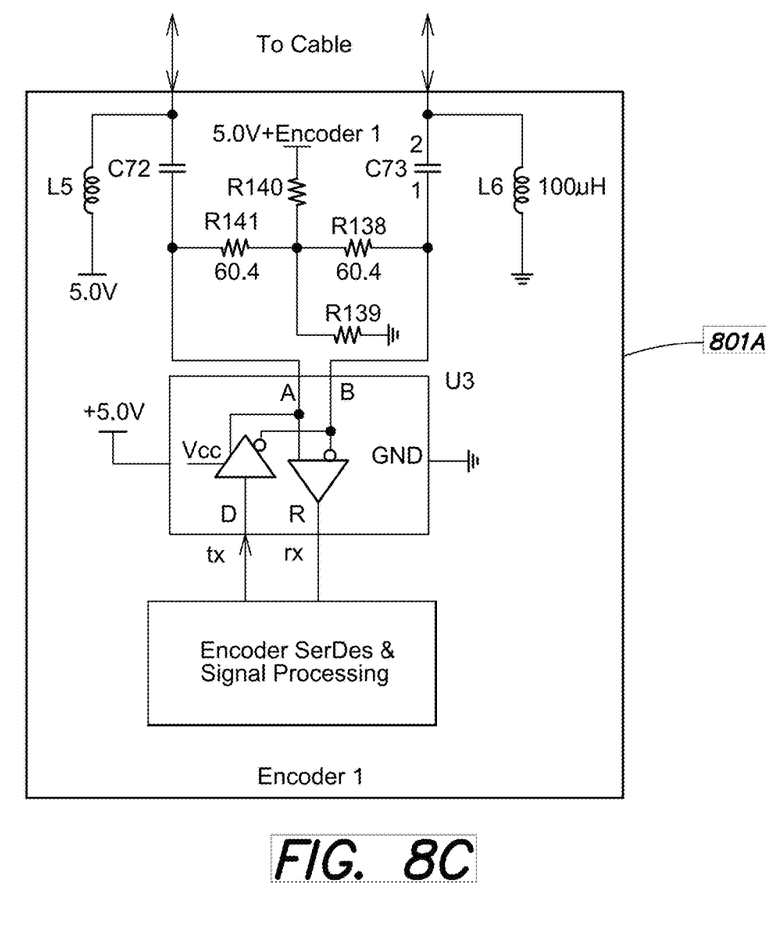

FIGS. 8A-8C show a circuit diagram of a master and slave according to various embodiments. As shown, a distributed system 800 may include a master controller 803 coupled to one or more sensor devices (e.g., encoders 1-N (801A-801N)) via a two conductor cable 802. In one embodiment, one of the conductors is a 5 V DC power source, and the other conductor is grounded. The conductors may be, as discussed above, twisted pair conductors within a shielded cable.

An example circuit associated with a controller 803 is shown with more particularity in FIG. 8B. In particular, controller 803 includes an element that performs signal processing of signals along with a serial/deserializer for communicating information which is superimposed upon a 5 V DC source. The controller is then coupled to the two conductor cable using, for example, the circuit elements as shown. Although not shown, controller 803 may be coupled to one or more external networks using one or more connections and/or protocols.

An example circuit associated with an example encoder 1 (element 801A) is shown by way of example in FIG. 8C. In particular, encoder 801A includes an element that performs signal processing of sensor signals along with a serial/deserializer for communicating information which is superimposed upon the 5 V DC signal. The encoder is then coupled to the two conductor cable using, for example, the circuit elements as shown in FIG. 8C.

Additional Embodiments

Various parts of this disclosure relates to a position sensing system employing one or more optical position sensors, and in particular to a system employing a particular communications interface between an optical encoder readhead and a separate master controller. According to one implementation, a system may employ one master controller and multiple readheads. For example, optical encoders may be used to monitor movements, particularly in robotics systems that require precise movements, need to prevent mechanical failures, and increase throughput. Such optical encoders may use laser or LED-based reflective refraction techniques for providing small, high resolution optical encoding functions. Generally, in such sensor types, they work by sensing a relative position of a sensor to that of a scale or grating. The sensor and grating are individually installed into a machine element with a pre-existing bearing structure. The sensor head emits a light source which reflects off of the grating, and is collected by a detector in the sensor head. Readings are digitized into a signal which is then communicated to the master controller.

In one implementation, data is transmitted bi-directionally between the encoder readheads and a the master controller. Data coming from the readheads to the master includes but is not limited to: position, index, limits, as well as alarms and safety signals. Data from the master to the readheads includes but is not limited to: readhead addresses, sampling commands, as well as setup and initialization information. These signals both to and from the master are in the form of serial digital words.

According to one implementation, the communication used between master and slave devices makes use, for example, of a Low Voltage Differential Signaling (LVDS) system to transmit high bitrate AC data on top of low voltage DC power. There are many advantages of using LVDS devices. They employ differential signaling, which means that any noise that is injected into the system from the outside will be common to both conductors in the system, therefore when the signals on the two conductors are differentially subtracted, the noise that is common to both will be rejected. LVDS systems are also easily implementable in an FPGA, are low cost, robust, and can operate at very high speeds. Although LVDS may be used, it should be appreciated that any appropriate differential signaling scheme may work.

In one such system, prior to LVDS, multiple analog signals are converted to digital signals, and are packaged into a string of serial digital words. These words are encoded using Manchester Encoding via an FPGA on the readhead system. One benefit of using Manchester encoding is that it is a data format that has zero DC value. This absence of a DC component occurs because there is a transition every clock cycle, so the voltage level will never stay constant for an extended period of time. If a data format were used that had a DC component, this low frequency component would get blocked by the capacitors in a circuit that are used for coupling the AC signal. Once the data is encoded, the data is transmitted by the LVDS transmitter across a cable that only has two conductors, power and ground. In one implementation, the cable is also double shielded. At the other end of the cable, data is received by the master by an LVDS receiver, which then routes the data to decoding circuitry.

The physical layer of the cable interface may involve modular connectors that allow for multiple access of sensors to the master controller. In one example implementation, the connectors involved have four terminals: power, ground, and terminals for terminating the inner shield and outer shield. Because the inner shield may be connected to ground, only three terminals are needed, but for practical purposes, the connectors may use four terminals.

In another implementation, the connectors have positive locking mechanisms to ensure that they do not become dislodged during operation, but they also can be disconnected if the user wishes to replace readheads, change cable length, etc. The master may also be modular, in that the sensors can be disconnected from the master (e.g., to be replaced in the field). If multiple readheads are involved, a bus may be provided for making multiple connections to the master. There are multiple inputs to the bus, and a single cable output that connects to the master.

In the event that there is too much of a voltage drop of the DC power, the use of upconverting voltage regulators to act as repeaters may be employed. These boost circuits are not located in the sensors, but rather they are located in the cable components themselves. This provides the benefit of decreasing sensor size, since the power electronics do not need to take up valuable real estate inside the sensor. These boost regulators ensure that the voltage level at each encoder will be enough to power the device and work at nominal operating levels.

According to one implementation, data transmission from the readheads to the master involves Manchester or other similar DC balanced encoding of the data when it is being transmitted. The received transmission is decoded by the master, which then discriminates the signals and reads each one as its original analog value. Manchester encoding (or other suitable encoding type) allows the clock for the sampling rate to be regenerated directly from the data at the receiving end. If multiple readheads are involved, each one is given an address by the master. When data is sent from a readhead to the master, the data must be accompanied by the unique address assigned to that readhead in order for proper signal discrimination. When the master sends a command to a specific readhead to sample data or to relay its unique setup information, only the readhead with the address that matches the one sent in the command will respond. The other readheads on the bus do not transmit any data and wait until receiving a command with their own unique address on the bus.

According to one implementation, it is appreciated that in certain environments (such as those where noise, electromagnetic interference, and other interference is present), error detection and/or error correction mechanisms may assist is avoiding errors. According to one implementation, the data packets end with error checking algorithms and are implemented as Cyclic Redundancy Checks (CRC). When a readhead sends its data to the master, the readhead performs the CRC algorithm and this information is sent at the end of the data packet. When the master receives that same data, the master determines its own CRC using the same algorithm. If the two results do not match, then there is an error in the data transmission, and at this point the master asks for the data to be retransmitted in an Automatic Repeat Request (ARQ). Although CRCs may be used, it should be appreciated that other error detection/correction mechanisms may be used such as, for example, Forward Error Correction (FEC), Error Correction Codes (ECCs), checksums, or other mechanisms.

At the output of the master device, the signal may be converted to a form that is useful for the customer using one or more protocols. For instance, the information generated by the master can be communicated using protocols that are more appropriate for other systems (e.g., longer transmission lengths, external system formats, etc.). For example, the signal may be communicated using the well-known BiSS, SPI, AquadB, or SSI interface protocols.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A sensor device, comprising:
    an interface comprising two conductors adapted for coupling to one or more external processing elements;
    a power-receiving element, coupled to the two conductors and adapted to receive a DC power from the two conductors; and
    a data-receiving element, coupled to the two conductors and adapted to receive an AC data signal superimposed over the DC power,
    wherein the sensor device is adapted to operate as a slave device and adapted for directly coupling to a master device through the two conductors, and wherein the sensor device is a positional encoder.

2. The sensor device according to claim 1, wherein the AC data signal is encoded using digital data.

3. The sensor device according to claim 2, wherein the AC data signal contributes a substantially zero superimposed DC voltage to the two conductors.

4. The sensor device according to claim 1, wherein the positional encoder is an optical position encoder.

5. The sensor device according to claim 1, further comprising a coupling element adapted to receive a cable, wherein the cable is adapted for coupling to a master device.

6. The sensor device according to claim 5, wherein the cable terminates in a first electrical connector adapted for removably coupling to a second electrical connector of the master device.

7. The sensor device according to claim 1, wherein the received DC power is generated by a master device coupled to the two conductors.

8. The sensor device according to claim 1, wherein the slave device is adapted to communicate with the master device in a bi-directional manner over the two conductors.

9. The sensor device according to claim 1, further comprising at least one boost regulator adapted to boost the DC power signal.

10. The sensor device according to claim 1, wherein the data-receiving element is adapted to receive the AC data signal via capacitive coupling.

11. The sensor device according to claim 1, wherein the AC data signal is encoded using at least one of Manchester encoding and a DC-balanced encoding.

12. The sensor device according to claim 1, wherein the DC power is a 5V power source.

13. The sensor device according to claim 1, wherein the at least one of the two conductors is coupled to ground.

14. The sensor device according to claim 1, wherein the positional encoder is configured to provide sensed position data in an electrical signal, and wherein the positional encoder, including the power-receiving element and the data-receiving element, are contained within a same package.

15. A distributed system, comprising:
    a plurality of sensor devices of claim 1 directly coupled to the master device in parallel with one another.

16. A distributed system comprising:
    a master device; and
    a positional encoder adapted to operate as a slave device and directly coupled to the master device by a two-conductor cable, wherein the master device is adapted to provide DC power to the positional encoder via the two-conductor cable and wherein the master device and the positional encoder are operable to communicate over the two-conductor cable using an AC signal superimposed over the DC power.

17. The distributed system according to claim 16, wherein more than one sensor device is coupled to the master device by the two-conductor cable and receives DC power from the master device.

18. The distributed system according to claim 16, wherein the positional encoder is further configured to provide sensed position data in an electrical signal.

19. The distributed system of claim 16, further comprising:
    a plurality of positional encoders, including the positional encoder, each adapted to operate as a slave device and each directly coupled to the master device in parallel with one another.

20. A distributed system, comprising:
    a master device comprising one or more processing elements;
    a slave device, comprising:
        a power-receiving element adapted to receive a DC power from the master device; and
        a data-receiving element adapted to receive an AC data signal from the master device, wherein the AC data signal is superimposed over the DC power,
        wherein the slave device is a positional encoder configured to provide sensed position data in an electrical signal; and
    an interface comprising two conductors directly coupling the master device to the slave device, wherein the two conductors are configured to provide the DC power and the AC data signal from the master device to the power-receiving element and the data-receiving element of the slave device, respectively.

* * * * *

UNITED STATES PATENT AND TRADEMARK OFFICE
CERTIFICATE OF CORRECTION

PATENT NO. : 10,536,033 B2  
APPLICATION NO. : 15/467944  
DATED : January 14, 2020  
INVENTOR(S) : Paul A. Remillard et al.

Page 1 of 1

It is certified that error appears in the above-identified patent and that said Letters Patent is hereby corrected as shown below:

On the Title Page

Item [57], Line 13, delete "The system is may be used" and insert --The system may be used--

Signed and Sealed this  
Fourth Day of August, 2020

Andrei Iancu  
*Director of the United States Patent and Trademark Office*